(12) United States Patent
Aviles et al.

(10) Patent No.: US 10,775,888 B2
(45) Date of Patent: Sep. 15, 2020

(54) METHOD AND SYSTEM FOR INTEGRATING HAPTIC FEEDBACK INTO PORTABLE ELECTRONIC DEVICES

(71) Applicant: Facebook, Inc., Menlo Park, CA (US)

(72) Inventors: Walter A. Aviles, San Diego, CA (US); Thomas G. Anderson, Albuquerque, NM (US); William Anderson, Albuquerque, NM (US); Daryl Lee, Albuquerque, NM (US)

(73) Assignee: Facebook, Inc., Menlo Park, CA (US)

( * ) Notice: Subject to any disclaimer, the term of this patent is extended or adjusted under 35 U.S.C. 154(b) by 107 days.

(21) Appl. No.: 13/768,189

(22) Filed: Feb. 15, 2013

(65) Prior Publication Data

US 2014/0232657 A1 Aug. 21, 2014

(51) Int. Cl.
*G06F 3/01* (2006.01)
*G06F 9/54* (2006.01)

(52) U.S. Cl.
CPC .............. *G06F 3/016* (2013.01); *G06F 9/541* (2013.01)

(58) Field of Classification Search
CPC ...................................................... G06F 3/016
See application file for complete search history.

(56) References Cited

U.S. PATENT DOCUMENTS

| | | | |
|---|---|---|---|
| 6,161,126 A * | 12/2000 | Wies et al. ..................... | 709/203 |
| 6,300,936 B1 * | 10/2001 | Braun et al. .................. | 345/156 |
| 7,752,596 B2 * | 7/2010 | Wyganowski ............ | G06F 8/36 717/100 |
| 2002/0163498 A1 * | 11/2002 | Chang et al. ................. | 345/156 |
| 2006/0066569 A1 | 3/2006 | Eid et al. | |
| 2008/0186152 A1 | 8/2008 | Kyung et al. | |
| 2011/0231899 A1 * | 9/2011 | Pulier ................. | G06F 9/45558 726/1 |
| 2011/0264491 A1 * | 10/2011 | Birnbaum et al. ........... | 705/14.4 |

(Continued)

FOREIGN PATENT DOCUMENTS

WO WO 2004/053830 A1 6/2004

OTHER PUBLICATIONS

"Immersion's MOTIV development platform integrates haptics into Android, we go hands-on" https://www.engadget.com/2011/02/10/immersions-motiv-development-platform-integrates-haptics-into-a/, Gorman Michael, Feb. 10, 2011 (Year: 2011).*

(Continued)

*Primary Examiner* — Matthew Yeung
(74) *Attorney, Agent, or Firm* — Fenwick & West LLP

(57) ABSTRACT

Methods for creating a haptic effect script for an application and producing haptic effects in response to an event occurring in an application are described Creating the haptic script includes launching an application, launching a scripting engine, monitoring a dynamic memory footprint for the application, receiving an indication of an event occurrence in the application, and determining changes to one or more values stored within the dynamic memory footprint that indicate the event occurrence. To produce the haptic effects, during execution and running of the application the dynamic memory footprint is monitored for value changes associated with an event occurrence as defined by the haptic event script and, if it is determined an event has occurred, the haptic script is executed to produce a haptic effect signal.

17 Claims, 6 Drawing Sheets

(56) References Cited

U.S. PATENT DOCUMENTS

2012/0221929 A1* 8/2012 Bolsinga ............. G06F 3/04883
715/205
2014/0012963 A1* 1/2014 Swenson ............ H04L 41/0813
709/220

OTHER PUBLICATIONS

Immersion Press Release, https://ir.immersion.com/news-releases/news-release-details/immersion-announces-motivtm-development-platform-android (Year: 2011).*
PCT International Search Report and Written Opinion, PCT Application No. PCT/US2014/016529, dated Aug. 18, 2014, eleven pages.

* cited by examiner

METHOD AND SYSTEM FOR INTEGRATING HAPTIC FEEDBACK INTO PORTABLE ELECTRONIC DEVICES

BACKGROUND

The present disclosure is related to enhancing user interaction with software applications running on a electronic device. More specifically, the present disclosure is related to provide haptic feedback to enhance user interaction with a software application running on a portable electronic device.

To provide haptic feedback, software applications typically implement underlying haptic techniques with whatever associated hardware is available. For example, an eccentric rotating mass (ERM) actuator may be activated to provide a vibration in a electronic device, or in a peripheral device associated with an electronic device, e.g., a joystick or gamepad for a video game console. To implement such a haptic technique, the software typically requires low level interfacing with the hardware in order to drive it at a fundamental level. Additionally, the software typically requires actual control over the hardware in order to generate tactile and kinesthetic feedback, so that tactile and kinesthetic haptic feedback and effects can be generated.

Additionally, to provide haptic feedback, the software for providing haptic feedback should interact with and provide an application the ability to use the haptic feedback capabilities provided by the hardware and the haptic software. Typically, application programming interfaces (APIs) or software development kits (SDKs) are developed and used by programmers to utilize the hardware and haptic software. These APIs and SDKs typically require application developers to modify their program's source code in order to use the haptic functionality. Given this type of integration into an application's source code, specific haptic effects can be tailored to specific events in the application since all application state and event information is available and known. For example, the application can cause haptic effects to execute whenever a weapon is fired, and different weapons can trigger different haptic effects. As the developer has access to the application's source code, the position of the gun in the applications internal map is also known and haptic spacialization, if available, can be accurately controlled.

This modification of an application's source code or resources, however, is not always possible. Frequently, due to proprietary and other concerns, source code or resources are not available to those desiring to add haptic support for a device to an application. If source code or resources are available for modification, the effort required to "haptically enable" a given application or set of applications may not be practical. Moreover, the source code of every application, for which haptic support is desired, needs to be modified.

There has also been some limited work on allowing haptic functionality to be triggered without requiring modification of an application's source code. Primarily, this has involved the use or analysis of the sounds generated by an application. The sounds generated are then used to trigger haptic functionality and effects. For example, the intensity of the sound generated by an application can be used to trigger haptic vibration effects whose intensity varies with that of the application's sound. The relative intensity of sounds in a stereo audio system can also be used to provide some position information about the sound sources in the audio signal. These techniques have the advantage that they do not require modification of an application or its resources in order to generate haptic effects.

These "external" techniques, however, are limited in their ability to discern specific information about events and spatial information in an application. For example, a haptic effect could execute upon the sound of a weapon being fired in an application, and the intensity of that effect could vary with the intensity of the sound. Without extensive real-time audio analysis or filtering, this same effect might also be triggered when a lion roars or a motorcycle rumbles in the application. Thus, the ability of these kind of systems to execute haptic effects and forces that are highly tailored to an application's state and events in the application is quite limited and nowhere near what can be achieved using source level integration or specific coding of audio or graphics signals and content.

SUMMARY

In one general respect, the embodiments disclose a method of creating a haptic effect script for an application. The method includes launching an application on an electronic device, launching a scripting engine, monitoring a dynamic memory footprint for the application, receiving an indication of an event occurrence in the application, and determining changes to one or more values stored within the dynamic memory footprint, wherein the changes to the one or more values indicate the event occurrence. In an embodiment, the dynamic memory footprint is stored in a non-transitory computer readable medium operably connected to a processing device configured to perform the method.

In another general respect, the embodiments disclose a method of producing haptic effects in response to an event occurring in an application. The method includes launching an application on a electronic device, loading a haptic event script associated with the application, monitoring a dynamic memory footprint for value changes associated with an event occurrence as defined by the haptic event script, and it is determined an event has occurred, executing the haptic event script to produce a haptic effect signal.

DETAILED DESCRIPTION

Figure 1:
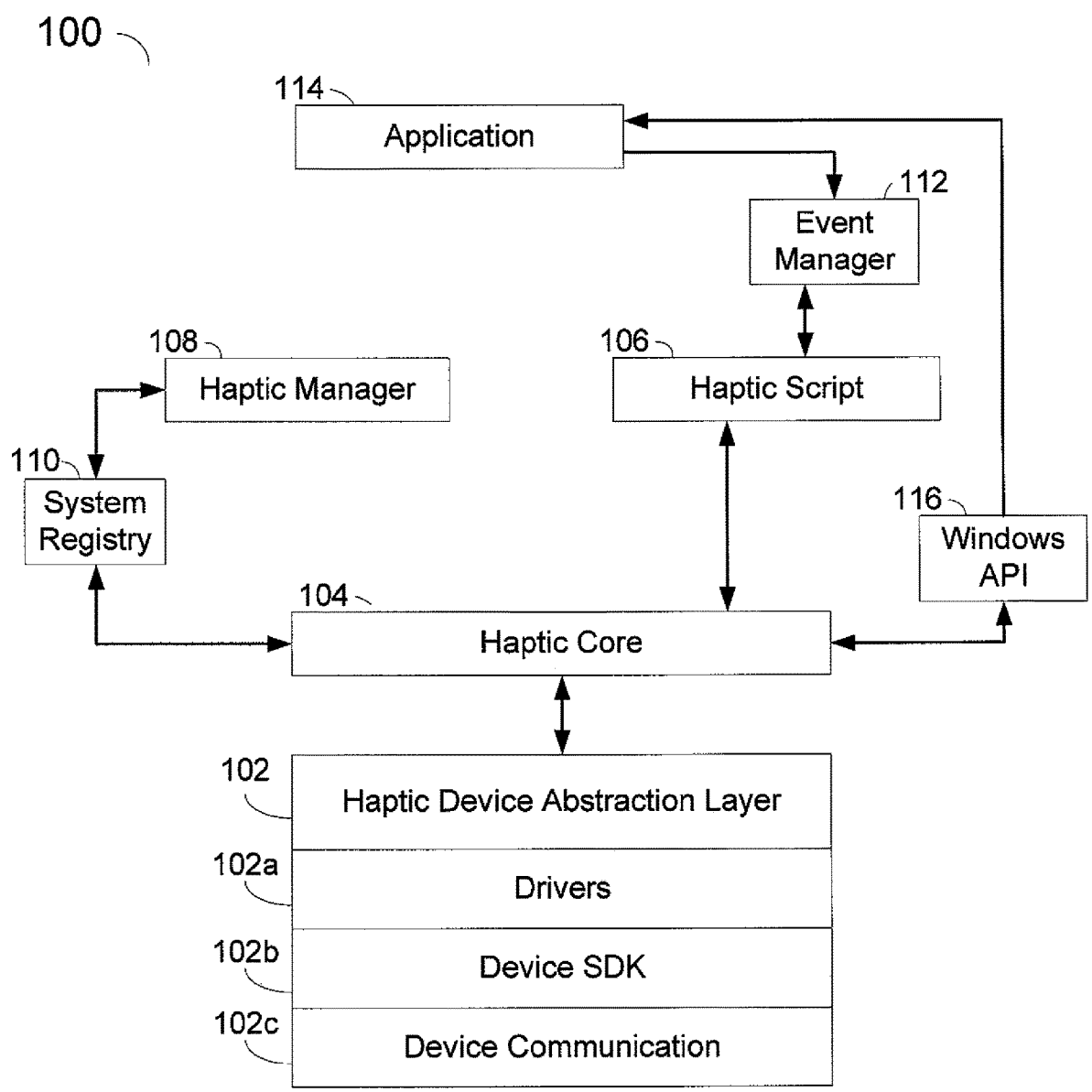
FIG. 1 depicts an example of a software architecture for haptic integration technology software according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "portable electronic device" refers to a hand-held device that includes a processor and a tangible, computer-readable memory, or which includes electronic sensors and actuators that may receive commands from and transmit information to an external processor via one or more transmitters and/or receivers. The memory may contain programming instructions in the form of a software application that, when executed by the processor, causes the device to perform one or more processing operations according to the programming instructions. Optionally, a portable electronic device may include a touch-sensitive screen or other touch-sensitive interface, including, but not limited to, resistive touchscreens, capacitive touchscreens, and infrared touchscreens. Examples of suitable devices include portable electronic devices such as tablet electronic devices, smartphones and gaming controllers.

"Haptic feedback," "haptic technology," or simply "haptics" refers to tactile and kinesthetic feedback technology that takes advantage of the sense of touch by applying forces, vibrations or motions to a user of a device. This mechanical stimulation may be used to assist in the creation of or interaction with virtual objects in a computer simulation or application as well as to convey more abstract information about the state of a computer simulation. Haptics are typically created and enabled by transducers or actuators that apply force that may be sensed by a human's skin an other human haptic sensory systems for touch feedback. The transducers or actuators may provide a mechanical motion in response to an electrical stimulus from, for example, a driver or driver circuit. Examples of haptic transducers include, but are not limited to, electrostatic displays that are configured to alter surface friction on a device. Examples of haptic actuators include, but are not limited to, DC motors, AC motors, vibratory motors, eccentric rotating mass (ERM) actuators, vibrotactile actuators, sound coils, electroactive polymers, piezoelectric actuators, electrostatic actuators, electroresistive actuators, subsonic audio wave actuators, and other similar actuators. As used herein, the term "haptic actuator" is considered to include both haptic actuators and transducers.

The present disclosure describes integrated software configured to perform a unique haptic integration technology (HIT) technique that provides much of the same application state and event information that can be achieved through source code integration and audio/graphic resource modification and coding without requiring changes to be made to the actual source code of an application. Such an approach results in specific and tailored haptic effects and events that may be generated in response to specific application state and events. The software may also support spatilization of the haptic effects in a particular electronic device. Like the source code example, by using HIT as described herein, haptic effects can execute whenever a specific event occurs, for example, a weapon being fired, and different weapons can trigger different haptic effects. Moreover, adding haptic support to a particular application requires minimal effort and no access to usually proprietary application source code and resources.

Fundamentally, the HIT techniques as described herein may allow a developer or individual to run an application and then discern specific and repeatable changes in the dynamic memory footprint of the application that occur in response to specific application state, actions or events. Specific memory identifiers (e.g., absolute or relative memory locations and pointers) may be identified for states and events of interest in the application by the developer using the HIT. The values contained in these memory identifiers, or pointed to by these memory identifiers, may indicate specific states or events. Based upon the knowledge of these specific states or events, the developer may write or otherwise generate an HIT script that links values and changes in these identifiers to specific haptic effects. The script may also allow chosen values and parameters in the script to be exposed for end user tuning and/or modification when the script is active.

The HIT software may also include collection of parameterizable fundamental haptic effects. The fundamental effects or collections of these fundamental effects may be used in the script to create additional haptic effects resulting from specific combinations of the fundamental effects.

The script generated by the HIT software may become part of a "profile" for the specific application. An application profile may be a data structure used by the HIT software to associate a particular application with information used by the HIT software. The application profile may be created or edited using a haptic manager, as discussed in greater detail below. For example, an application profile may include several pieces of information, including, but not limited to, a path or filename of an application executable file and a path or filename of a haptic script to be used by the HIT software when the application is executed. The application profile may be stored in an operating system registry such that anytime that the specific application is activated, the HIT software loads the correct script so that specific haptic effects will occur in response to specific application state and events. A runtime portion may also allow users to dynamically load, change and modify profiles for applications using a GUI. For example, the application profile may include an image or a path/filename for an image such that the image is opened in the haptic manager. Similarly, an information page may be associated with the application profile for viewing/editing in the haptic manager.

It should be noted that the HIT software may allow things other than the state of dynamic memory footprint to be used to trigger haptic feedback effects. For example, the HIT software may incorporate a "keyboard listener" capability that provides for keyboard and mouse events to be used to trigger haptic effects. Additional specifics related to the HIT software, and related methods and systems for its use, are described in the following discussion of the figures.

FIG. 1 illustrates an example of software architecture for HIT software 100 according to an embodiment. The software 100 may include a haptic device abstraction layer (HDAL) 102 in communication with a haptic core 104. The HDAL 102 may provide an interface between the software 100 and the haptic actuation hardware (e.g., the haptic actuators and associated controllers). The HDAL 102 may be a framework configured such that drivers for specific devices may be added easily to a driver layer 102a and without modification to the source code of the HDAL framework. Typically, a driver is written as a dynamic link library (DLL), written to conform to standard framework interface requirements. The driver layer 102a may wrap a lower-level device-specific SDK layer 102b. Similarly, the SDK layer 102b may provide or utilize a device communication layer 102c in order to communicate with the haptic devices. For example, the device communication layer 102c may include a universal serial bus (USB) to serial communication interface.

The haptic core 104 may be configured to provide a uniform call interface to a family or collection of fundamental haptic effects. These fundamental haptic effects may be parameterized and chained together for more complex effects. For example, a simple "envelope" effect may be parameterized to feel like a gun recoil, and the gun recoil may be repeated to provide a machine gun feel.

A haptic script module 106 may be in communication with the haptic core 104, and configured to do the parameterization and chaining of the fundamental haptic effects in response to instructions received from an event manager 112. The haptic scripting module 106 may use a scripting interface to develop a script of haptic events for a specific application, in this example, application 114. A haptic script may be a data structure containing various information that associates specific application events with specific haptic effects. The haptic script may be created prior to the creation of the application profile so that the application profile may accurately list and associate a specific haptic script with its associated application. In the event the haptic script is updated, the application profile may be updated as well via a haptic manager 108.

As described in additional detail below, the haptic script module 106 provides a script for particular haptic effects associated with a specific application using the HIT techniques as described herein without access to the application's source code. Rules for creating the haptic effects may be generated and stored in a data file or executable program that is separate from that of application, so that no modification of or access to the application's source code is necessary.

The scripting interface used by the haptic script module 106 may provide a technical user, programmer, or application manager with various tools to create and modify more detailed application settings. The scripting interface may be intended for technical users, though a standard user interface may be provided that simplifies the use for a non-technical user.

The haptic core 104 may have an associated core set of haptic effects it is configured to implement. A specific haptic script may associate an application event with one or more of these haptic effects using a scripting language (e.g., via an open source scripting language like Squirrel). Each of the haptic effects may include one or more parameters that may be set in the haptic script. The haptic script may also include one or more haptic effect parameters that are able to be modified or tuned by a user. For example, the haptic script may include a parameter for overall strength of haptic feedback. The user may be able to modify this parameter via the haptic manager 108 when the associated application profile is loaded.

In order to execute a script for an application, an event manager 112 may be used to monitor for and record events occurring in the application 114, and relay this information to the haptic script module 106. The event manager 112 may record a specific event occurring, and relay this event to the haptic script module 106 for processing. The haptic script module 106 may determine an appropriate effect (or chain of effects) based upon the event occurring, and send a notification to the haptic core 104 of the effect to output. The haptic core 104 may send an appropriate message to the HDAL 102, instructing the HDAL to output the haptic event to the appropriate haptic actuator(s).

The haptic manager 108 may provide such a user interface for interacting with the software 100 and, more particularly, the haptic script module 106 and scripting interface. The haptic manager 108 may allow a user to adjust settings to their specific preferences, select or import a set of customized settings, set profiles for application executables, link in a specific script for an application, map events to application events, and generally control settings such as sensitivity settings of haptic force settings. The haptic manager 108 may be used to create and edit a user profile, and control specific applications directly. For example, a user may use the haptic manager 108 to load an existing user profile and launch an application. Upon launching the application, the haptic manager 108 may automatically configure the application to the user profile settings.

In order to initially create a script, a memory scanning application may be used to locate one or more dynamic or static memory locations for an application that are associated with some application state or event that is to be associated with a haptic effect. Additional detail related to the determination of events and producing a related script for an application is provided in the discussion of FIG. 2 below.

Depending on the implementation of the software 100 and the application 114, the haptic core 104 may communicate with the application via an API, for example, a Windows® API 116 as shown in FIG. 1. However, it should be noted this is shown by way of example only, and additional APIs may be used depending on the operating system environment in which the software 100 and the application 114 are being run.

The software 100 may include additional tools and utilities not shown in FIG. 1. For example, the event manager 112 may include an input listener to detect any user input via a system keyboard, mouse or other input device, such as a touchscreen, and, based upon the type of user input, provide a haptic effect accordingly. For example, a software application may be configured to monitor the input/output ports for any input devices to determine whether the user has performed a specific input such as a keystroke or mouse-click. Similarly, the event manager may allow the use of a haptic device to emulate the system keyboard or mouse. This may be useful for a sophisticated haptic device where motion of a three-dimensional force feedback device may be used to run the mouse cursor.

Figure 2:
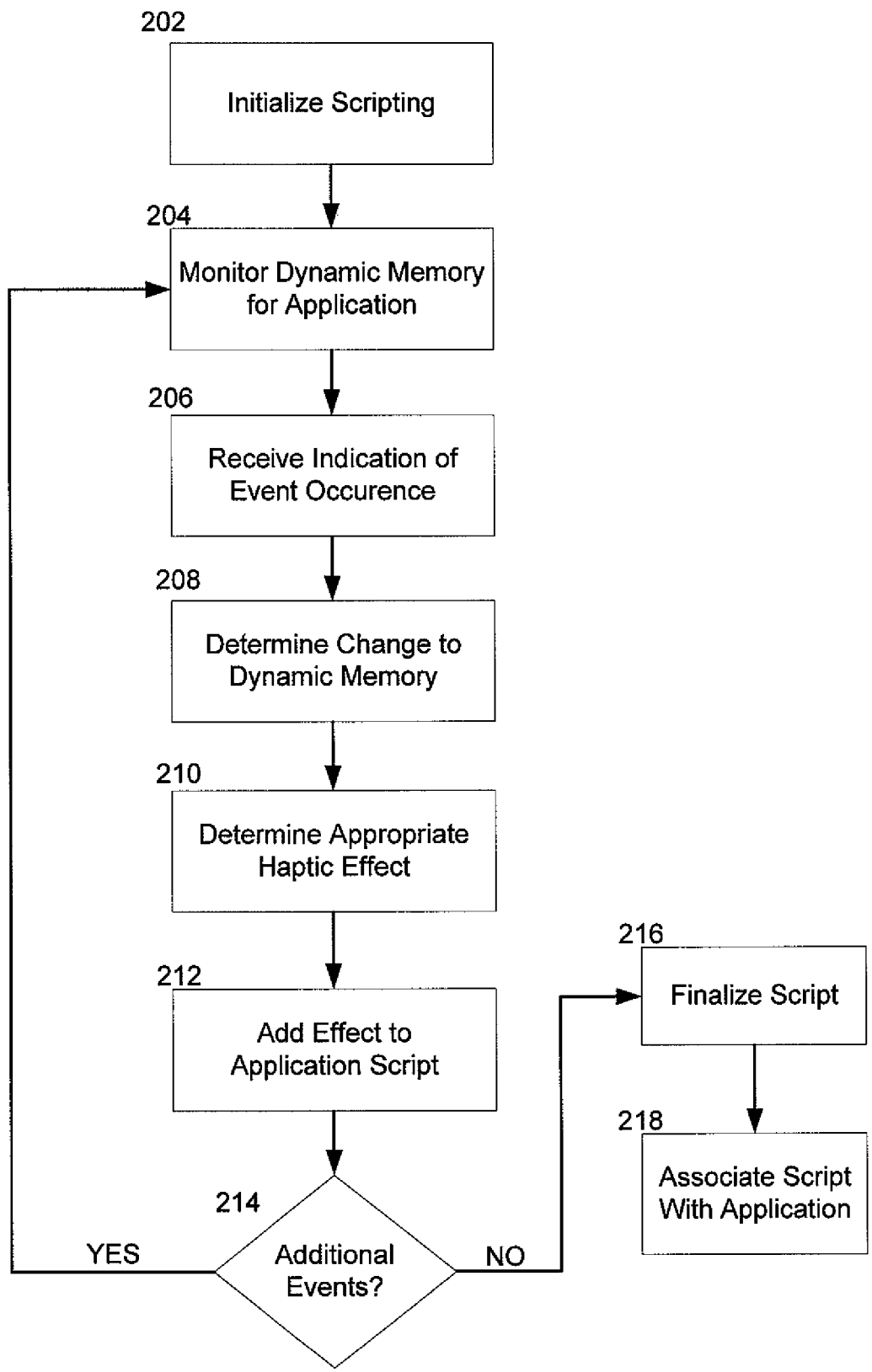
FIG. 2 depicts a flow chart illustrating a process for creating a haptic script for an application according to an embodiment.

FIG. 2 depicts a flowchart illustrating a process for creating and registering a script with an application by HIT software such as software 100 as shown in FIG. 1. The HIT software may initialize 202 the scripting process based upon one or more user actions, such as launching an application to script as well as launching a memory scanner. The user may access the haptic manager, indicate an application to script, open the application and the memory scanner. In one embodiment, the user may access and open the application and the memory scanner via the HIT software. For example, the HIT software may include a search feature that allows a user to locate an executable shortcut for an application and launch that application via the HIT software interface. Alternatively, the user may have the application to be scripted running in the background when launching the HIT software or, conversely, the user may have the HIT software running in the background when launching the application.

To produce an accurate haptic script, one or more dynamic or static memory locations associated with an application may be found by scanning the memory during the application's run time. Within the memory, individual locations associated with some application state or event that a developer or user wants to associate a haptic effect with are located. For example, a developer may want to associate a haptic effect with how hard a specific character is hit in a game. The developer uses the memory scanner to find a memory location and its state value that provides some numerical indication of how hard that character was hit. The memory location and state value may be extracted and inserted into the haptic script, and then used to both trigger and parameterize a haptic effect. For example, the haptic scripting engine may indicate in the haptic script that a haptic effect is triggered is the state value for a specific memory location changes by 5 or more units from some initial value. Thus, during application run time, the HIT software is detecting some change in the memory location state values associated with an application event, and the minimum change to that state value that is used to trigger a haptic effect. When the state value changes by the minimum amount (e.g., 5 units), the haptic core may trigger one or more core haptic effects to cause haptic feedback, e.g., a vibration. The intensity or other characteristic of the haptic effects may also be modified by that state value, or other associated state values.

More specifically, to determine indications of events caused by the application, the memory scanner software may monitor 204 the dynamic memory footprint for the application. To monitor 204, the memory scanner software may take a snapshot of the dynamic memory footprint every clock cycle or, to improve performance, every set number of clock cycles. The memory scanner software may take this snapshot by recording a set of values associated with the application in the dynamic memory. When launched, the application may initialize a series of integer values, or other similar values depending on how the source code for the application is written, and each value may have a specific location or pointer in memory. Each of these locations or pointers may be monitored 204 by the memory scanner software. For example, if the application is a first person shooter game, the application may initialize a number of values related to various features of the game such as available weapons, amount of ammo associated with each weapon, location and type of vehicles, which vehicle a user is currently using, speed of the vehicle, and other similar values associated with the game. Each time a user interacts with such a feature, the value in memory may change accordingly.

As the user interacts with the application, the user may cause an event to occur in the application that should trigger one or more haptic effects. For example, the user may fire a specific gun. The user may access the haptic script module and submit an indication of the event occurrence. The HIT software may receive 206 this indication of the event occurrence and determine 208 the changes to the dynamic memory footprint that indicate this event has occurred. The HIT software may determine 208 such a change to comparing the previously monitored 204 dynamic memory footprint with an updated version. The HIT software may also determine what classification and type of event occurred, and, based upon this information, determine 210 an appropriate haptic effect. For example, a user may assign a haptic effect to a particular event in the application, so that whenever the device detects occurrence of the event in the application, the haptic effect is triggered.

Once the HIT software has determined 210 an appropriate haptic effect for an event, the HIT software may add 212 rules for the haptic event to the application script via an associated scripting engine such as Haptic Script Module 106 as shown in FIG. 1, the script addition including the specific memory changes that indicate the event has occurred. The application script may be configured such that the event manager loads the data from the application script upon launching the application, loads the various events and associated haptic effects, and instructs the event manager to monitor the dynamic memory of the application as the user interacts with the application. Additional detail related to the application script is provided in the discussion of FIG. 3 below.

The HIT software and haptic script module may receive 214 an indication from the user as to whether there are additional events in the application to script. If there are additional events, the memory scanner software may continue to monitor 204 the dynamic memory of the application. If there are no additional events to script, the HIT software and haptic script module may finalize 216 the script and associate the script 218 with the specific application via the haptic manager by associating the script with the application in the application profile. Then, upon launching the application in the future, the event manager detects the application launch in the system registry and loads the application script. Alternatively, the HIT software may associate 218 the script with the application by monitoring the executable file of the application to include a call to load the script, or by creating a batch file that causes the application to launch while simultaneously loading the associated script.

Figure 3:
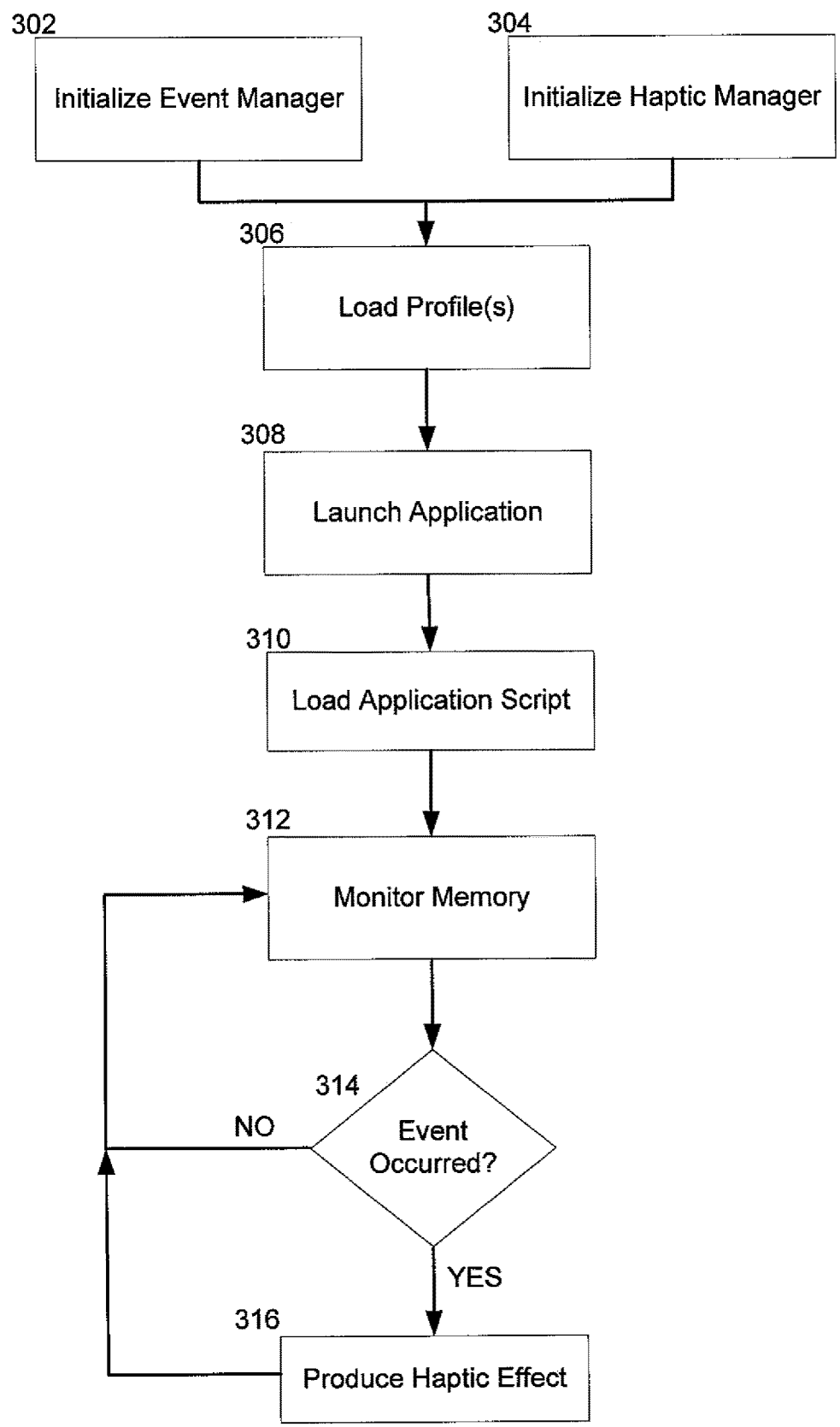
FIG. 3 depicts a flow chart illustrating a process for integrating a created script with an application during user interaction with the application according to an embodiment.

FIG. 3 depicts a flowchart illustrating a process for running an application having an associated script. A user may launch the HIT software. The HIT software may initialize 302 the event manager as well as initialize 304 the haptic manager. The event manager may run in the background of the device, monitoring the system registry of the device for the launching of any applications. It should be noted that the haptic manager is generally used to create and edit application profiles and, as such, the initialization 304 of the haptic manager maybe optional.

The HIT software may also load 306 a profile for the user. The user profile may include various settings for the user, such as haptic feedback levels, and other information related to the user. The user may launch 308 the application. As described above, the HIT software may include an option for the user to directly launch 308 the application from the HIT software. Alternatively, the user may launch the application separately, with the HIT software running in the background. In this scenario, the event manager may monitor the system registry for the launch of the application. The application may run on one device (such as a gaming console) while the HIT software may run on another device (such as a gaming controller). Alternatively, the application software and gaming software may concurrently execute on a single device.

During or after the application is launched 308, the HIT software may load 310 the haptic event script associated with the application. In order to obtain the haptic event script, the process as outlined in FIG. 2 may be used. Alternatively, a software developer who developed the application may provide a haptic event script configured to run with the HIT software.

During operation of the software application, the HIT software may read the script and identify areas in the dynamic memory footprint for the application where changes may occur that indicate events occurring that should trigger a haptic effect. The HIT software may monitor 312 the memory for these changes via the event manager. If the HIT software does not determine 314 an event has occurred, the HIT software may continue to monitor 312 the dynamic memory. When an appropriate memory locations designated in the haptic script does change, the HIT software determines 314 an event has occurred and the HIT software may produce 316 a haptic effect via the haptic core with the parameter values found in the haptic script, or the parameters overridden/tuned by the user via the haptic manager. As discussed above, the haptic effect may be one or more individual effects loaded from an effects library and chained together to for a more detailed, extended haptic effect. In order to produce 316 the haptic effect, the HIT software may generate a signal via the haptic core and transmit the signal to a haptic actuator, or to a controller associated with a haptic actuator, for translation into a haptic effect.

It should be noted the processes as shown in FIGS. 2 and 3 are shown by way of example only. Various changes, to the processes may be made depending upon the implementation and execution of the HIT software and the applications.

Figure 4:
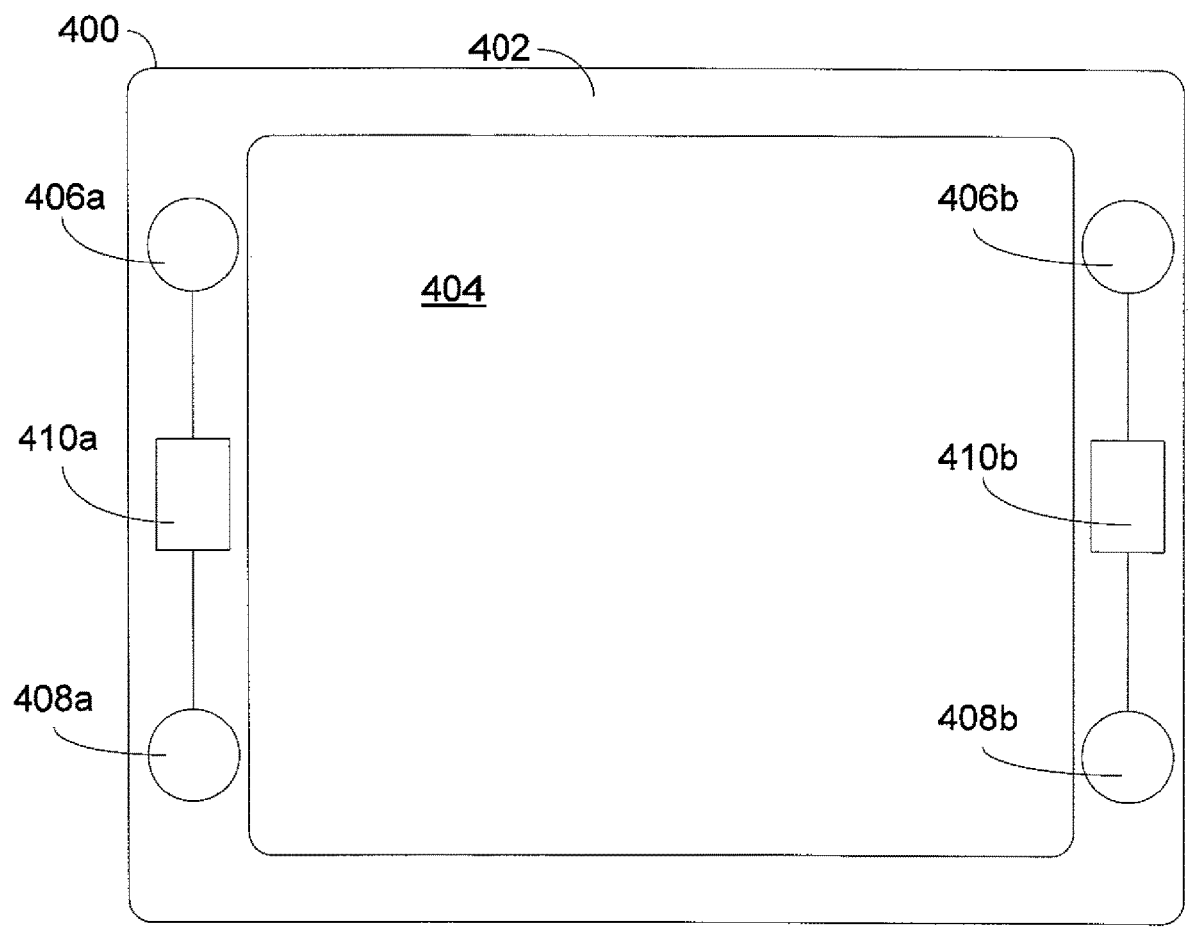
FIG. 4 depicts an example layout of various haptic actuators to produce various haptic effects in a portable electronic device according to an embodiment.

FIG. 4 illustrates an example of a portable electronic device such as a tablet computer 400 including multiple actuators for providing haptic effects. Typically, when designing a tablet computer, interior space is limited, especially beneath the touchscreen. For example, as shown in FIG. 4, space beneath the touchscreen 404 of table computer 400 is limited, especially for placement of non-critical components such as haptic actuators. As such, a plurality of haptic actuators 406a, 406b, 408a and 408b may be placed about the perimeter of the tablet computer 400, under the bezel 402. It should be noted that the placement of the haptic actuators 406a, 406b, 408a and 408b is shown by way of example only.

Each set of haptic actuators may be driven by a controller. For example, haptic actuators 406a and 408a may be driven by motor controller 410a. Similarly, haptic actuators 406b and 408b may be driven by motor controller 410b. Each of haptic actuators 406a, 406b, 408a and 408b may be a vibrotactile actuator. For example, each of the haptic actuators 406a, 406b, 408a and 408b may be an eccentric rotating mass (ERM) actuator in communication with a miniature dual serial motor controller, e.g., ERM actuators 406a and 408a may be in communication with miniature dual serial motor controller 410a, and ERM actuators 406b and 408b may be in communication with miniature dual serial motor controller 410b.

The motor controllers 410a and 410b may be controlled using ASCII command strings through a specific communication port. Referring back to FIG. 1, the motor controllers 410a and 410b may communicate with the Device SDK layer 102b, or directly device communication layer 102c.

In order to provide haptic feedback, the HIT software may be configured to provide the motor controllers 410a and 410b with appropriate control signals, thus resulting in the haptic actuators 406a, 406b, 408a and 408b providing the appropriate haptic feedback. Various haptic feedback techniques such as beam forming, frequency sweeping, and other similar techniques may be used to localize the haptic feedback in the electronic device. This is especially useful for tablet computers where space is limited, and the haptic actuators may be placed in remote areas from where the haptic feedback is desired.

Figure 5:
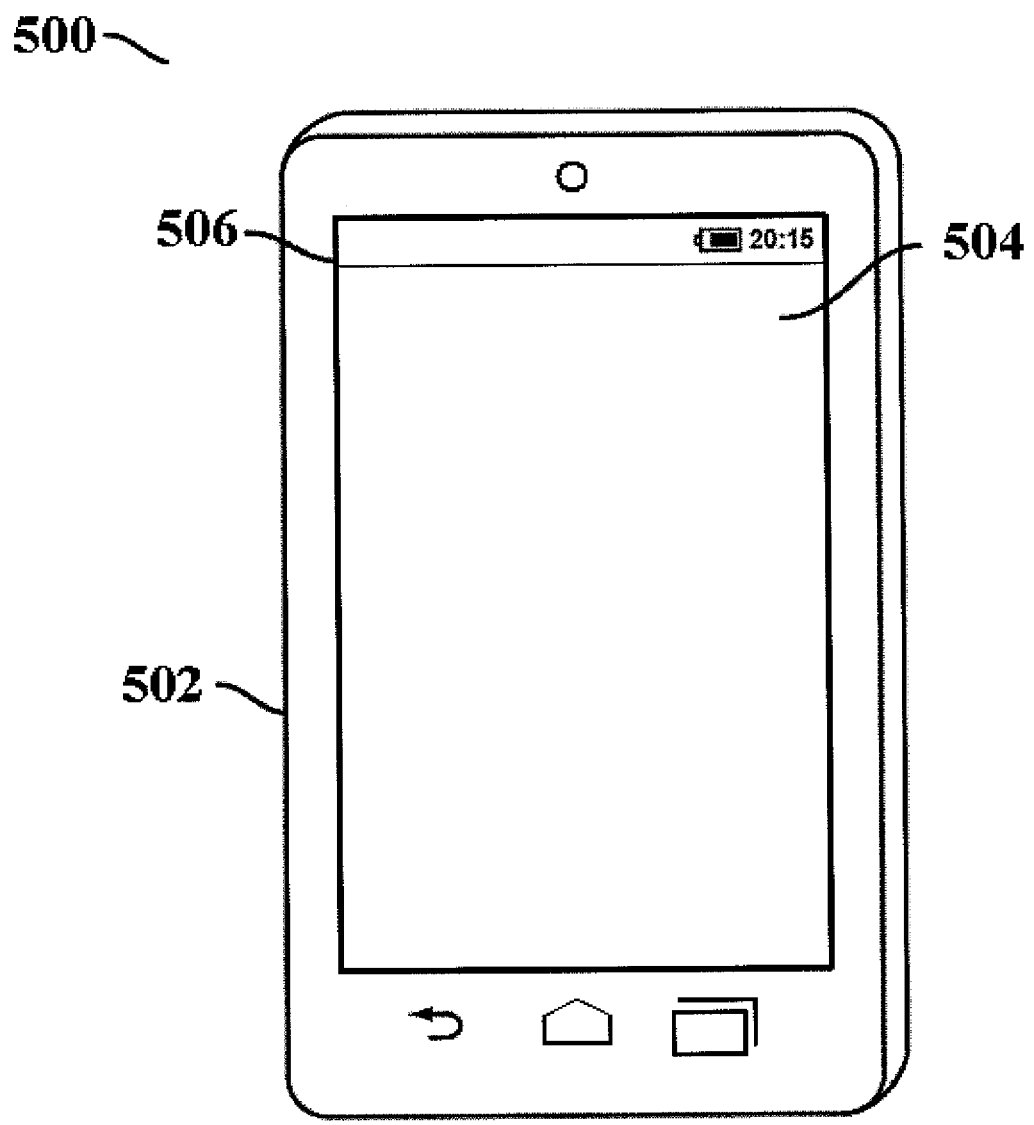
FIG. 5 depicts an example of a portable electronic device.
Figure 6:
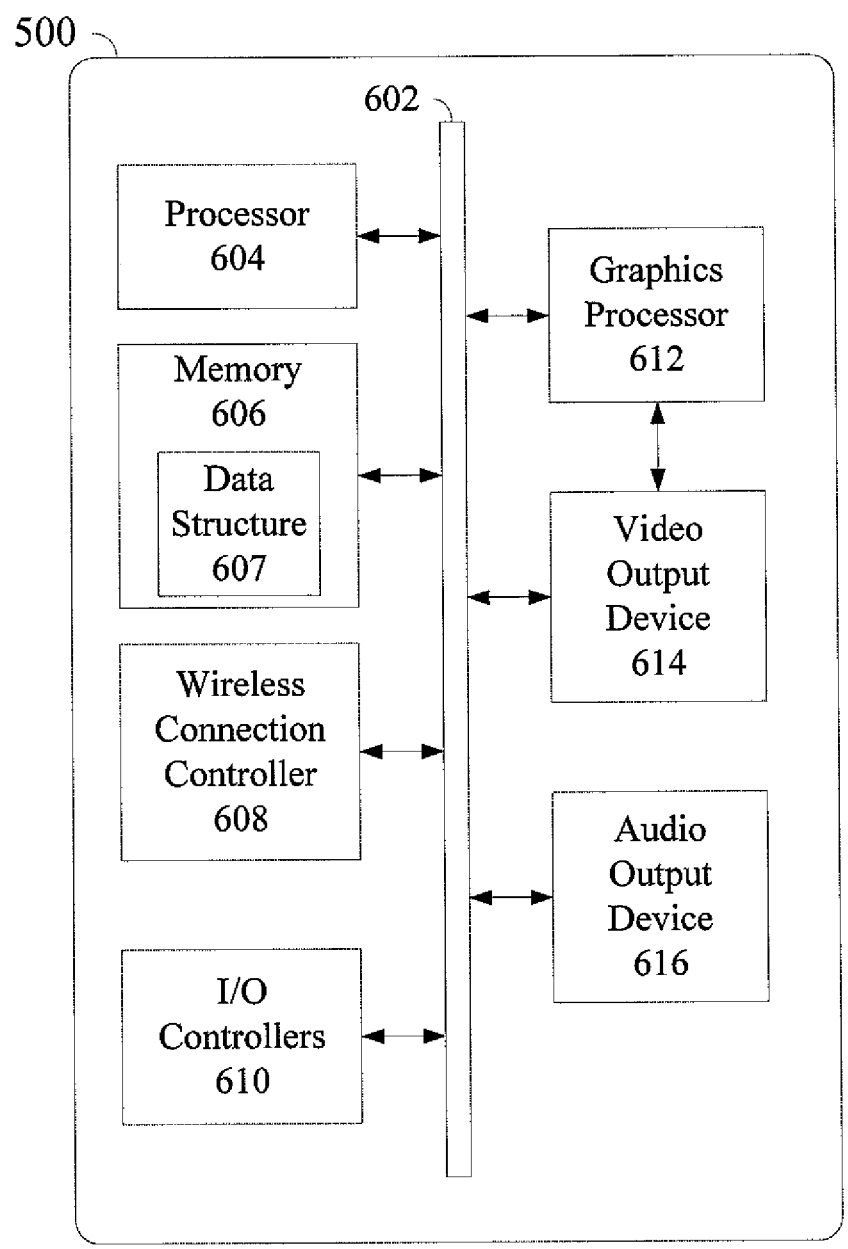
FIG. 6 depicts an example of a system diagram for a portable electronic device.

FIGS. 5 and 6 illustrate an addition example of a portable electronic device 500. The portable electronic device 500 includes a bezel or case 502 for enclosing and protecting various operating components of the portable electronic device. The portable electronic device 500 further includes a combination input and display component 504. In this example, the input and display component 504 is a touchscreen configured to both receive user input as well as display information. The input and display component 504 includes one or more sensors configured to detect a touch input and, in response, generate one or more signals that may be acted upon by a processor. It should be noted, however, the input and display component 504 is shown by way of example only. The mobile device may include a keypad, track-pad, track-ball, haptic controlling device, or other similar input device in combination with a display screen. The portable electronic device 500 may also include a status or notification bar 506 for displaying information relevant to the current operation of the portable electronic device, such as battery life, message indicators, connection strength indicators, and other similar information. Various other components such as one or more speakers, one or more cameras, one or more microphones, input ports, output ports, memory card slots, and other components may be integrated into the portable electronic device 500 as well.

FIG. 6 illustrates an example of a system diagram for the portable electronic device 500. Various internal components may be operably connected to a bus 602. A processing device or processor 604 may be operably connected to the bus 602. Similarly, a tangible and non-transitory computer readable medium or memory 606 may be operably connected to the bus 602 and configured to store various programming instructions to be run by the processor 604. The memory 606 may further store content items such as applications, videos, documents, audio files and similar content for processing and display/presentation on the portable electronic device 500. In some alternative embodiments, the content items may be stored in a remote storage location such as a networked server or a cloud storage device and accessed by the portable electronic device 500 as needed.

Additionally, the memory 606 may be configured to store a data structure 607 for storing a library of application scripts, instructions or executable files for launching an application and its associated script, and other related information for the HIT software to access. The data structure 607 may be a database or other type of data structure configured to store organized information and provide searching and retrieval features for the information.

A wireless connection controller 608 may be operably connected to the bus 602 and configured to establish one or more wireless network connections. For example, the wireless connection controller 608 may be configured to establish a cellular telephone connection, a cellular data network connection (e.g., a 3G or 4G data connection), a wireless data network or WiFi connection (e.g., a 802.11n connection), a Bluetooth® connection, and other similar wireless connections. It should be noted that a single wireless connection controller 608 is shown by way of example only. A portable electronic device may include multiple wireless connection controllers to increase throughput across multiple networks simultaneously.

One or more input/output (I/O) controllers 610 may be operably connected to the bus 602 and configured to control various input and output devices. For example, the I/O controller 610 may be operably connected to the input and display component 504 as shown in FIG. 5. Similarly, an I/O controller 610 may be operably connected to the motor controllers 408a and 408b as shown in FIG. 4. The I/O controllers 610 may also be operably connected to a graphics processor 612, a video-output device 614 and an audio output device 616 via the bus 602, and configured displaying and/or presenting various images, videos, audio files, and other content to a user of the portable electronic device 500 via an output device such as the input and display component 504.

It should be noted the architecture and arrangement of components as shown in FIGS. 4, 5 and 6 are shown by way of example only to illustrate an exemplary portable electronic device. Depending on the design, construction and intended purpose of the portable electronic device, the type and arrangement of components may be altered. For example, if the portable electronic device is a smartphone, additional components related to capturing a user's voice, converting the voice to a digital signal, and transmitting and receiving digitized voice information would be included.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method comprising:
   loading, by a processing device, a haptic integration technology (HIT) software application, the HIT software application configured to produce one or more haptic effects;
   launching, by the processing device, an application separate from the HIT software application, the application not configured to produce the one or more haptic effects;
   monitoring, by the HIT software application, a dynamic memory footprint of the application, the dynamic memory footprint comprising one or more values associated with a state of the application, the application stored in a memory operably connected to the processing device, wherein the monitoring comprises recording a first set of values within the dynamic memory footprint associated with the application at certain time intervals;
   determining, by the HIT software application, an occurrence of an event based on changes to the one or more values stored within the dynamic memory footprint of the application;
   determining, by the HIT software application, a haptic effect to be associated with the event occurrence; and
   adding, by the HIT software application, the haptic effect to a haptic event script associated with the application, wherein execution of the haptic event script is configured to generate the haptic effect on an output interface coupled to the processing device.

2. The method of claim 1, further comprising:
   associating, by the HIT software application, the haptic event script with the application;
   monitoring, by the HIT software application, an executable file of the application to detect a subsequent launch of the application; and
   in response to detecting the subsequent launch of the application:
      loading the haptic event script associated with the application;
      monitoring, by the HIT software application, one or more values stored within a dynamic memory footprint of the subsequently launched application;
      detecting, by the HIT software application, an occurrence of an event based on changes to the one or more values, the detecting based on the haptic event script associated with the application; and
      in response to detecting the occurrence of the event, generating a haptic effect on the output interface coupled to the processing device.

3. The method of claim 1, wherein the haptic effect comprises a vibrotactile actuated effect.

4. The method of claim 1, wherein the haptic effect comprises an electroresistive actuated effect.

5. The method of claim 1, wherein determining changes to the one or more values stored within the dynamic memory footprint comprises:
   recording an updated set of values within the dynamic memory footprint; and
   comparing the set listing of values with the first set of values to determine any changes.

6. A method of producing haptic effects in response to an event occurring in an application, the method comprising:
   launching, by a processing device, an application on an electronic device, the application not configured to produce one or more haptic effects;
   loading, by the processing device, a haptic event script associated with the application;
   monitoring, by a haptic integration technology (HIT) software application configured to produce one or more haptic effects and separate from the application, a dynamic memory footprint of the application for value changes associated with an event occurrence as defined by the haptic event script, wherein the monitoring comprises recording a first set of values within the dynamic memory footprint associated with the application at certain time intervals; and
   responsive to determining, by the HIT software application, an event has occurred:
   executing, by the processing device, the haptic event script to produce a haptic effect signal.

7. The method of claim 6, further comprising transmitting, by the processing device, the haptic effect signal to one of a haptic actuator or a controller to produce haptic feedback.

8. The method of claim 7, wherein the haptic actuator comprises a vibrotactile actuator.

9. The method of claim 7, wherein the haptic actuator comprises an electroresistive actuator.

10. The method of claim 6, wherein monitoring the dynamic memory footprint for value changes comprises:
    determining, based upon the haptic event script, one or more event occurrence values in the dynamic memory; and
    monitoring the one or more event occurrence values in the dynamic memory for any changes, wherein a change to one or more event occurrence values indicates an event occurrence in the application.

11. The method of claim 6, wherein producing a haptic effect signal comprises:
    loading, from the haptic event script, an appropriate haptic effect based upon the event occurrence;
    creating, based upon the loaded appropriate haptic effect, the haptic effect signal; and
    transferring the haptic effect signal to one of a haptic actuator or a controller associated with at least one haptic actuator.

12. The method of claim 6, wherein the electronic device is a portable electronic device.

13. A non-transitory computer readable medium comprising computer executable instructions, encoded thereon that, when executed by a processor causes the processor to perform operations, the instructions comprising instructions to:

load, by the processing device, a haptic integration technology (HIT) software application, the HIT software application configured to produce one or more haptic effects;

launch, by the processing device, an application separate from the HIT software application, the application not configured to produce the one or more haptic effects;

monitor, by the HIT software application, a dynamic memory footprint of the application, the dynamic memory footprint comprising one or more values associated with a state of the application, the application stored in a memory operably connected to the processing device, wherein the monitoring comprises recording a first set of values within the dynamic memory footprint associated with the application at certain time intervals;

determine, by the HIT software application, an occurrence of an event based on changes to the one or more values stored within the dynamic memory footprint of the application;

determine, by the HIT software application, a haptic effect to be associated with the event occurrence; and add, by the HIT software application, the haptic effect to a haptic event script associated with the application, wherein execution of the haptic event script is configured to generate the haptic effect on an output interface coupled to the processing device.

14. The non-transitory computer readable medium of claim 13, wherein the instructions further comprise instructions to:

associate, by the HIT software application, the haptic event script with the application;

monitor, by the HIT software application, an executable file of the application to detect a subsequent launch of the application; and in response to detecting the subsequent launch of the application:
load the haptic event script associated with the application;
monitor, by the HIT software application, one or more values stored within a dynamic memory footprint of the subsequently launched application;
detect, by the HIT software application, an occurrence of an event based on changes to the one or more values, the detecting based on the haptic event script associated with the application; and
in response to detecting the occurrence of the event, generate a haptic effect on the output interface coupled to the processing device.

15. The non-transitory computer readable medium of claim 13, wherein the haptic effect comprises a vibrotactile actuated effect.

16. The non-transitory computer readable medium of claim 13, wherein the haptic effect comprises an electroresistive actuated effect.

17. The non-transitory computer readable medium of claim 13, wherein determining changes to the one or more values stored within the dynamic memory footprint comprises:

record an updated set of values within the dynamic memory footprint; and compare the set listing of values with the first set of values to determine any changes.

* * * * *